(12) United States Patent
Tomita et al.

(10) Patent No.: US 9,733,780 B2
(45) Date of Patent: Aug. 15, 2017

(54) TOUCH PANEL

(71) Applicant: FUJITSU COMPONENT LIMITED, Tokyo (JP)

(72) Inventors: Masanari Tomita, Tokyo (JP); Shozo Furukawa, Tokyo (JP); Nobuya Iwasaki, Tokyo (JP); Hideyuki Hagihara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 99 days.

(21) Appl. No.: 14/967,467

(22) Filed: Dec. 14, 2015

(65) Prior Publication Data

US 2016/0188042 A1 Jun. 30, 2016

(30) Foreign Application Priority Data

Dec. 25, 2014 (JP) .................................. 2014-263132

(51) Int. Cl.
*G06F 3/041* (2006.01)
*G06F 3/0488* (2013.01)
*G06F 3/045* (2006.01)

(52) U.S. Cl.
CPC .................................... *G06F 3/045* (2013.01)

(58) Field of Classification Search
CPC .......... G06F 3/041; G06F 3/044; G06F 3/045; G06F 3/0488
See application file for complete search history.

(56) References Cited

U.S. PATENT DOCUMENTS

| 9,329,710 B2* | 5/2016 | Kim | G06F 3/041 |
| 9,417,746 B2* | 8/2016 | Tada | G06F 3/044 |
| 9,480,147 B2* | 10/2016 | Kim | H05K 1/0259 |
| 2012/0075218 A1* | 3/2012 | Lin | G06F 3/0418 345/173 |
| 2015/0130763 A1* | 5/2015 | Park | G06F 3/041 345/174 |

FOREIGN PATENT DOCUMENTS

JP 3157059 U 1/2010

\* cited by examiner

*Primary Examiner* — Ricardo L Osorio
(74) *Attorney, Agent, or Firm* — IPUSA, PLLC

(57) ABSTRACT

A touch panel includes a first substrate having a first conductive film formed on a surface thereof, a second substrate disposed to face the first substrate on a same side thereof as the first conductive film, the second substrate having a second conductive film formed on a surface thereof facing toward the first substrate, a decorative layer formed on the first conductive film on a surface thereof facing toward the second substrate, the decorative layer being formed along a perimeter of the first substrate, a first wire formed on the decorative layer on a surface thereof facing toward the second substrate, a first insulating layer laminated to the first wire, a second wire formed on the second conductive film on a surface thereof facing toward the first substrate, and a second insulating layer laminated to the second wire.

8 Claims, 5 Drawing Sheets

TOUCH PANEL

BACKGROUND OF THE INVENTION

1. Field of the Invention

The disclosures herein relate to a touch panel.

2. Description of the Related Art

A touch panel is a widely used device that is provided on the surface of a display device such as a liquid crystal display to detect the position of contact by a fingertip or pen. Among various types of touch panels, the four-wire resistive touch panel has been widely used because of its simple structure which enables low-cost manufacturing.

The four-wire resistive touch panel has the configuration in which two transparent substrates each having a transparent conductive film formed on one surface thereof are disposed such that the transparent conductive films face each other. The transparent substrates have electrical wires formed therebetween along the perimeter thereof. These wires include electrodes for generating a potential gradient in a transparent conductive film in the X direction and electrodes for generating a potential gradient in a transparent conductive film in the Y direction perpendicular to the X direction.

Some touch panels have a decorative layer along the perimeter edges of an operating surface, for example, for the purpose of aesthetic improvement (see Japanese Utility Model Registration No. 3157059, for example).

A touch panel having a decorative layer on the operating surface may have a drawback in that a step structure formed by the decorative layer on the operating surface degrades aesthetic appearance. There is also a risk of the decorative layer being removed from the operating surface to expose internal electrical wires to degrade aesthetic appearance.

Accordingly, there may be a need to provide a touch panel that has an even operating surface and improved aesthetic appearance.

SUMMARY OF THE INVENTION

It is a general object of the present invention to provide a touch panel that substantially obviates one or more problems caused by the limitations and disadvantages of the related art.

According to one embodiment, a touch panel includes a first substrate having a first conductive film formed on a surface thereof, a second substrate disposed to face the first substrate on a same side thereof as the first conductive film, the second substrate having a second conductive film formed on a surface thereof facing toward the first substrate, a decorative layer formed on the first conductive film on a surface thereof facing toward the second substrate, the decorative layer being formed along a perimeter of the first substrate, a first wire formed on the decorative layer on a surface thereof facing toward the second substrate, a first insulating layer laminated to the first wire, a second wire formed on the second conductive film on a surface thereof facing toward the first substrate, and a second insulating layer laminated to the second wire.

According to at least one embodiment, a touch panel is provided that has an even operating surface and improved aesthetic appearance.

Other objects and further features of the present invention will be apparent from the following detailed description when read in conjunction with the accompanying drawings.

DESCRIPTION OF THE PREFERRED EMBODIMENTS

In the following, embodiments will be described by referring to the accompanying drawings. In these drawings, the same elements are referred to by the same references, and a description thereof may be omitted.

First Embodiment

Figure 1:
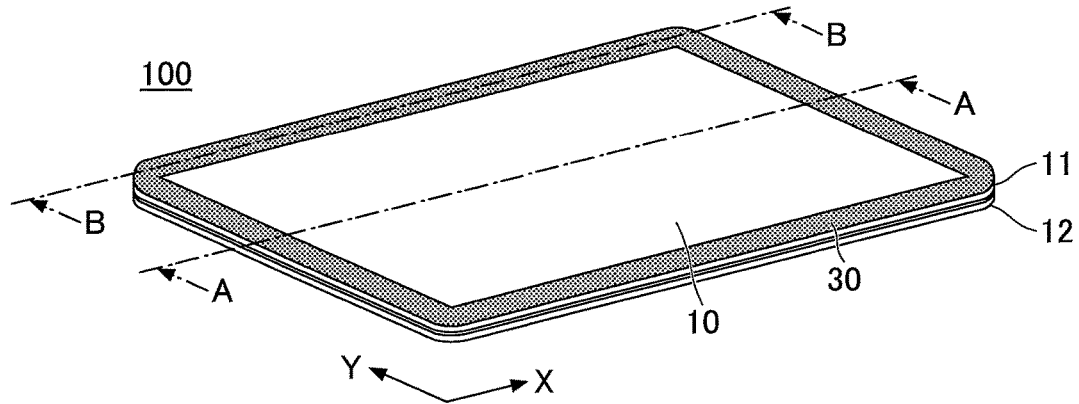
FIG. 1 is a perspective view of an example of a touch panel according to a first embodiment.
Figure 2:
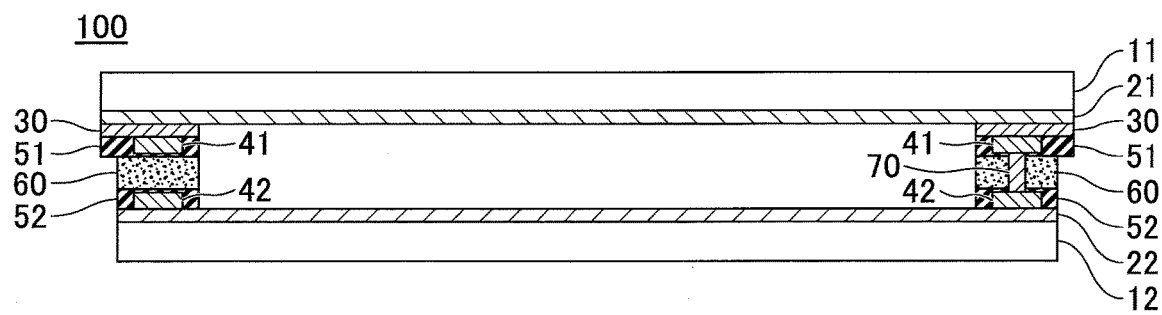
FIG. 2 is a cross-sectional view taken along the line A-A illustrated in FIG. 1.

FIG. 1 is a perspective view of an example of a touch panel 100 according to a first embodiment. FIG. 2 is a cross-sectional view taken along the line A-A illustrated in FIG. 1. In the following, the longitudinal direction of the touch panel 100 is referred to as an X direction, and the transverse direction is referred to as a Y direction.

As illustrated in FIG. 1, the touch panel 100 includes a first substrate 11, a second substrate 12, and a decorative layer 30. The touch panel 100 detects the position of contact made by a fingertip or a pen within an operating area 10 surrounded by the decorative layer 30 on the surface of the first substrate 11 opposite from the second substrate 12.

The first substrate 11 has a rectangular shape, and is made of transparent, easily-bendable material such as PET (polyethylene terephthalate) or PC (polycarbonate). The second substrate 12 has substantially the same rectangular shape as the first substrate 11, and is made of transparent inorganic material such as glass or transparent resin material. The first substrate 11 and the second substrate 12 are situated to face each other across a predetermined gap. The shape of the first substrate 11 and the second substrate 12 is not limited to a rectangle.

On the surface of the first substrate 11 facing toward the second substrate 12 (i.e., the lower surface thereof in FIG. 2), layers including a first conductive film 21, the decorative layer 30, a first wire 41, and a first insulating layer 51 are formed in this order from the first substrate 11 toward the second substrate 12. On the surface of the second substrate 12 facing toward the first substrate 11 (i.e., the upper surface thereof in FIG. 2), layers including a second conductive film 22, a second wire 42, and a second insulating layer 52 are formed in this order from the second substrate 12 toward the first substrate 11. The first substrate having the first conductive film 21 and other layers formed thereon is bounded to the second substrate 12 having the second conductive film 22 and other layers formed thereon through an adhesive layer 60 disposed between the first insulating layer 51 and the second insulating layer 52.

The first conductive film 21 and the second conductive film 22 are made of electrically conductive transparent material that is metal oxide such as ITO (indium-tin oxide) or AZO (Al-doped zinc oxide). The material of the first conductive film 21 and the second conductive film 22 is not limited to the above-noted materials, and may alternatively be conductive polymer, metal nanowires, carbon nanotubes, or the like.

The decorative layer 30 is formed in a frame shape along the perimeter of the first substrate 11 on the surface of the first conductive film 21 facing toward the second substrate 12. The decorative layer 30 is made of opaque material that does not allow passage of light so as to hide the first wire 41, the second wire 42, and the like when viewed from the direction of the first substrate 11. Conductive materials such as conductive polymer, conductive carbon, or resin inclusive of metal may be used for the decorative layer 30.

The first wire 41 is formed on the surface of the decorative layer 30 facing toward the second substrate 12. The first wire 41 includes a pair of electrodes that extend in the Y direction and are arranged side by side in the X direction, and also includes interconnections coupled to the electrodes. The first wire 41 is coupled to a flexible substrate or the like (not shown).

The first wire 41 is coupled to the first conductive film 21 through the decorative layer 30 that is made of conductive material. Voltage is applied through the first wire 41 to the pair of electrodes arranged side by side at a spaced interval in the X direction so as to generate a potential gradient in the first conductive film 21 in the X direction.

The second wire 42 is formed on the surface of the second conductive film 22 facing toward the first substrate 11. The second wire 42 includes a pair of electrodes that extend in the X direction and are arranged side by side in the Y direction, and also includes interconnections coupled to the electrodes. The second wire 42 is coupled to a flexible substrate or the like (not shown).

The second wire 42 is coupled to the second conductive film 22 laminated thereto. Voltage is applied through the second wire 42 to the pair of electrodes arranged side by side at a spaced interval in the Y direction so as to generate a potential gradient in the second conductive film 22 in the Y direction.

Alternatively, the configuration may be such that the first wire 41 creates a potential gradient in the first conductive film 21 in the Y direction, and the second wire 42 crates a potential gradient in the second conductive film 22 in the X direction.

The first insulating layer 51 is laminated to the lower surface of the first wire 41 in FIG. 2 to cover the first wire 41, thereby insulating the first wire 41. The second insulating layer 52 is laminated to the upper surface of the second wire 42 in FIG. 2 to cover the second wire 42, thereby insulating the second wire 42.

The adhesive layer 60 is disposed between the first insulating layer 51 and the second insulating layer 52 to bond the first substrate 11 and the second substrate 12 to each other.

One or more penetrating holes are formed through the first insulating layer 51, the adhesive layer 60, and the second insulating layer 52 between the first wire 41 and the second wire 42. A connecting part 70 fills the penetrating hole to provide a connection between the first wire 41 and the second wire 42. The connecting part 70 may be made of a conductive double-sided tape or conductive adhesive material such as conductive adhesive agent, and is placed in physical contact with both the first wire 41 and the second wire 42.

The first wire 41, the first insulating layer 51, the adhesive layer 60, the connecting part 70, the second insulating layer 52, and the second wire 42 are situated within the area covered by the decorative layer 30 between the first substrate 11 and the second substrate 12, and are thus hidden when viewed from the direction of the first substrate 11. Further, the decorative layer 30 is situated between the first substrate 11 and the second substrate 12, so that the surface of the first substrate 11 is even and flat. This arrangement enables the improvement of aesthetic appearance of the touch panel 100 by hiding the first wire 41 and the like from the view taken from the direction of the first substrate 11 while providing an even surface to the first substrate 11.

The decorative layer 30 is formed of conductive material between the first conductive film 21 and the first wire 41. This arrangement enables the provision of electrical coupling between the first conductive film 21 and the first wire 41 despite the fact that the decorative layer 30 is disposed between the first conductive film 21 and the first wire 41.

During the operation of the touch panel 100, the potential gradient in the first conductive film 21 in the X direction and the potential gradient in the second conductive film 22 in the Y direction are formed alternately in time. Pressing a point in the operating area 10 of the first substrate 11 by means of a fingertip or a pen causes the first substrate 11 to bend, thereby causing the first conductive film 21 to come in physical contact with the second conductive film 22. A contact between the first conductive film 21 and the second conductive film 22 allows an X coordinate of the contact point to be obtained when the potential gradient in the X direction is present in the first conductive film 21. A contact between the first conductive film 21 and the second conductive film 22 allows a Y coordinate of the contact point to be obtained when the potential gradient in the Y direction is present in the second conductive film 22. This arrangement enables the detection of the contact position within the operating area 10 of the touch panel 100.

Improving precision in contact-point detection involves providing a potential gradient in the first conductive film 21 that have equipotential contours extending parallel to the Y direction and providing a potential gradient in the second conductive film 22 that have equipotential contours extending parallel to the X direction.

In the case of the entirety of the decorative layer 30 being made of conductive material for the purpose of simplified manufacturing processes, the voltage applied to the first wire 41 causes a potential gradient to be also generated in the decorative layer 30. The potential gradient generated in the decorative layer 30 affects the potential gradient present in the first conductive film 21, thereby causing the equipotential contours in the first conductive film 21 to deform and fail to be parallel to the Y direction.

In consideration of the above, the touch panel 100 of the present embodiment has two slits in the first conductive film 21 in the area where the decorative layer 30 is not present inside the decorative layer 30, such that the two slits extend in the X direction and arranged side by side at a spaced interval in the Y direction.

Figure 3:
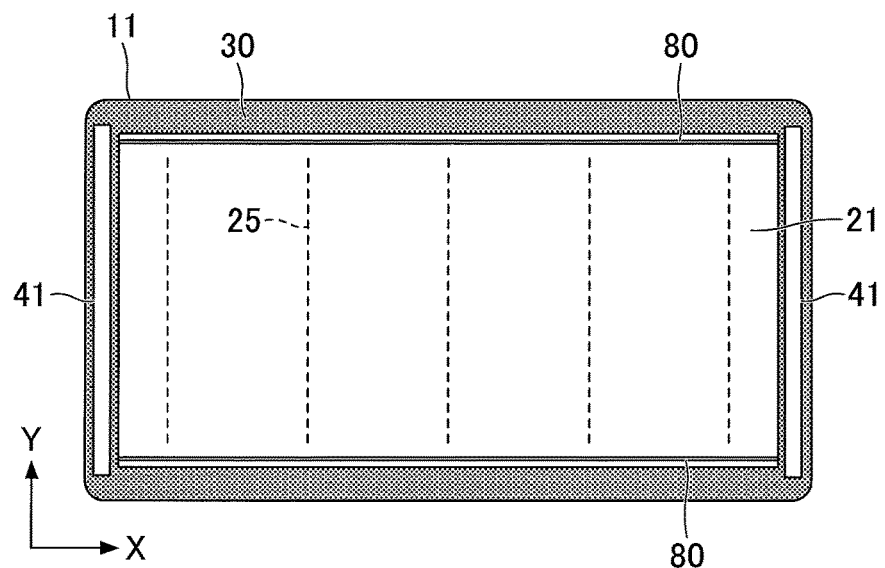
FIG. 3 is a bottom view of an example of a first substrate according to the third embodiment.

FIG. 3 is a bottom view of the first substrate 11 having the slits according to the first embodiment.

As illustrated in FIG. 3, the first conductive film 21 has slits 80 formed therein extending parallel to the X direction in the area where the decorative layer 30 is not provided, such that the slits 80 are situated in the vicinity of two sides of the decorative layer 30 that are at opposite ends in the Y direction. The slits 80 are formed as thin as possible within a distance of 10 mm from the decorative layer 30 in the Y direction in order to avoid reducing the area for detecting a contact point.

The slits 80 may be formed by removing part of the first conductive film 21 in a line shape that is formed on the first substrate 11, for example. A method of removing the first conductive film 21 includes radiating a laser light, performing dry or wet etching, or the like, but is not limited to those examples. The number of slits 80 is not limited to two. Forming a slit along each side produces satisfactory results.

As illustrated in FIG. 3, the provision of the slits 80 in the first conductive film 21 causes the potential gradient in the first conductive film 21 to have equipotential contours 25 parallel to the Y direction, which enables an accurate detection of a contact position.

In the case of the electrodes being disposed side by side at a spaced interval in the Y direction with respect to the first conductive film 21, slits are formed in the vicinity of two sides of the first conductive film 21 that are at opposite ends in the X direction, such that the slits extend parallel to the Y direction and are arranged side by side at a spaced interval in the X direction. This arrangement ensures that the potential gradient have the equipotential contours thereof extending parallel to the X direction, which enables an accurate detection of a contact position.

In the following, the configuration of the connecting part 70 will be described.

Figure 4A:
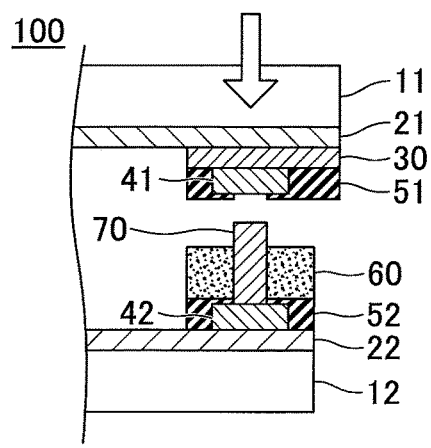
FIGS. 4A and 4B are drawings illustrating an example of the configuration of a connecting part according to the first embodiment.
Figure 4B:
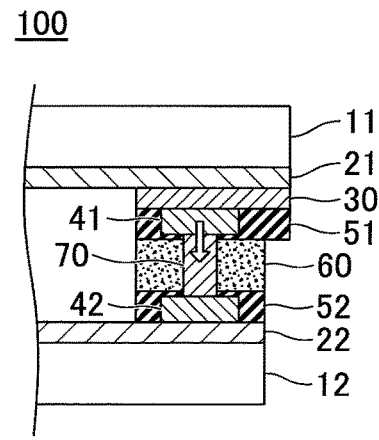

FIGS. 4A and 4B are drawings illustrating an example of the connecting part 70 that is a conductive double-sided tape. FIG. 4A illustrates the first substrate 11 and the second substrate 12 before they are bonded together. FIG. 4B illustrates the first substrate 11 and the second substrate 12 after they are bonded together.

The conductive double-sided tape used as the connecting part 70 is made of expandable material. A conductive double-sided tape may typically be made of a metal foil or unwoven fabric containing carbon, conductive filler, or conductive polymer, for example, but is not limited to these examples.

The conductive double-sided tape preferably has a thickness greater than the whole length of the penetrating hole before the first substrate 11 and the second substrate 12 are bonded together, as illustrated in FIG. 4A. Provision of such a thickness means that the conductive double-sided tape is in a compressed state due to pressures applied by the first substrate 11 and the second substrate 12 when these substrates are bonded together as illustrated in FIG. 4B. The conductive double-sided tape in the compressed state exerts a repulsive force towards the first substrate 11 and the second substrate 12, which ensures secure physical contact and secure electrical coupling with both the first wire 41 and the second wire 42.

Figure 5A:
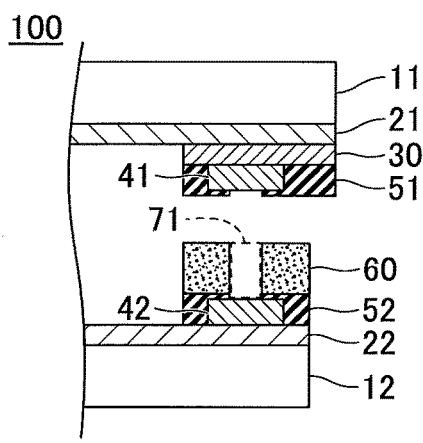
FIGS. 5A and 5B are drawings illustrating another example of the configuration of a connecting part according to the first embodiment.
Figure 5B:
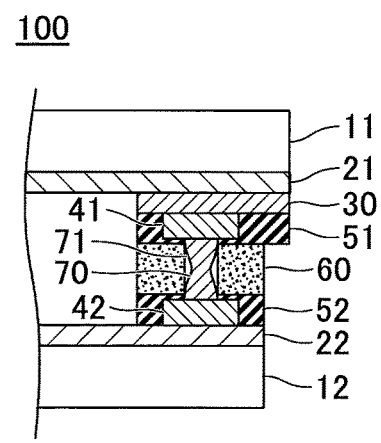

FIGS. 5A and 5B are drawings illustrating an example of the connecting part 70 that is made of conductive adhesive agent. FIG. 5A illustrates the first substrate 11 and the second substrate 12 before they are bonded together. FIG. 5B illustrates the first substrate 11 and the second substrate 12 after they are bonded together. Conductive adhesive agent may typically be conductive polymer, resin material containing metal or carbon, or the like, but is not limited to these examples.

The amount of conductive adhesive agent filling a penetrating hole 71 formed between the first wire 41 and the second wire 42 is in accordance with the size of the penetrating hole 71. An excessive amount of conductive adhesive agent may cause the first substrate 11 to bulge locally at the position of the conductive adhesive agent, thereby degrading the flatness of the surface of the first substrate 11. An insufficient amount of conductive adhesive agent filling the penetrating hole 71 may result in the conductive adhesive agent being not in contact with both the first wire 41 and the second wire 42, thereby causing a contact failure.

The conductive adhesive agent is in contact with both the first wire 41 and the second wire 42 after the first substrate 11 and the second substrate 12 are bonded together as illustrated in FIG. 5B, thereby establishing an electrical connection between the first wire 41 and the second wire 42. The conductive adhesive agent does not have to fully fill the penetrating hole 71. There may be a void inside the penetrating hole 71.

In the following, a description will be given of the configuration that ensures the evenness of the first substrate 11.

Figure 6:
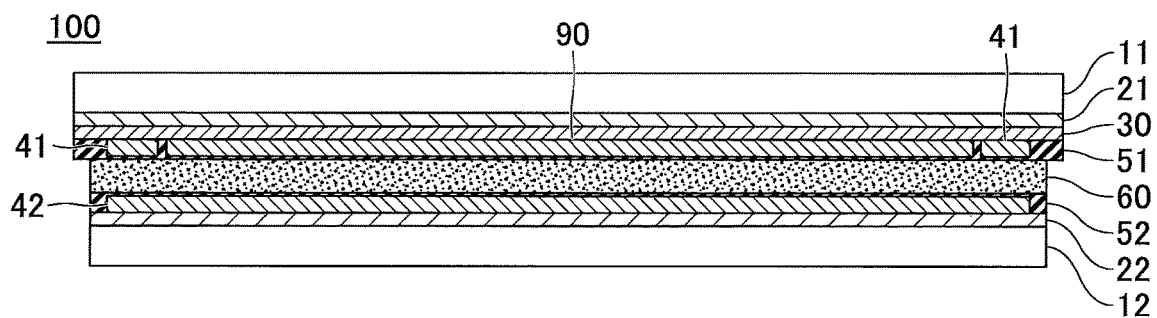
FIG. 6 is a cross-sectional view taken along the line B-B illustrated in FIG. 1.

FIG. 6 is a cross-sectional view taken along the line B-B illustrated in FIG. 1. The touch panel 100 of the present embodiment has a dummy pattern 90 serving as a thickness adjustment part that is formed in an area where the first wire 41 is not situated, as illustrated in FIG. 6.

In the case of the dummy pattern 90 being not provided in the touch panel 100, the first substrate 11 may dent at the area where the first wire 41 is not formed, thereby creating an uneven surface. In the present embodiment, the dummy pattern 90 having the same thickness as the first wire 41 is formed in the area of the first substrate 11 where the first wire 41 is not disposed, thereby ensuring that the first substrate 11 maintains an even surface.

What material is used for the dummy pattern 90 does not matter as long as the dummy pattern 90 can be formed in the same thickness as the first wire 41. The dummy pattern 90 may be formed by use of the same material as the first wire 41 and in the same process step as the step of forming the first wire 41. Such an arrangement ensures that the dummy pattern 90 be formed without complicating the manufacturing process.

Figure 7:
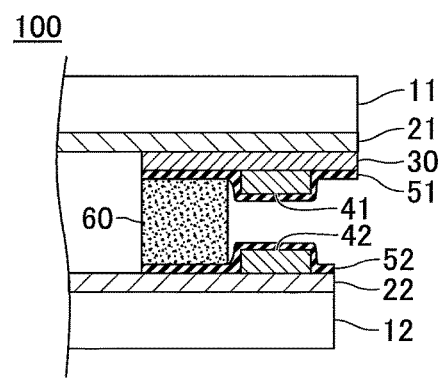
FIG. 7 is a drawing illustrating another example of the configuration of a connecting part according to the first embodiment.

Further, as illustrated in FIG. 7, the touch panel 100 has the adhesive layer 60 that is formed in the area where neither the first wire 41 nor the second wire 42 is disposed.

The provision of the adhesive layer 60 in an overlapping manner at the position of the first wire 41 and the second wire 42 may cause the first substrate 11 to bulge locally at the position of the first wire 41 and the second wire 42, thereby causing the first substrate 11 to have an uneven surface. In consideration of this, the adhesive layer 60 is formed in the area where neither the first wire 41 nor the second wire 42 is formed, thereby ensuring that the first substrate 11 has an even surface.

As described above, the touch panel 100 of the first embodiment is configured such that the first substrate 11 has an even surface, and has the aesthetic appearance thereof improved by hiding behind the decorative layer 30 the first wire 41, the second wire 42, and the like that are disposed between the first substrate 11 and the second substrate 12.

Second Embodiment

In the following, a second embodiment will be described with reference to the accompanying drawings. A description will be omitted of the same elements as those of the embodiments already described.

In a touch panel 200 of the second embodiment, the first wire 41 has part thereof laminated to the decorative layer 30 and an end part thereof placed in physical contact with the first conductive film 21 at the position at which the decorative layer 30 is not formed.

Figure 8:
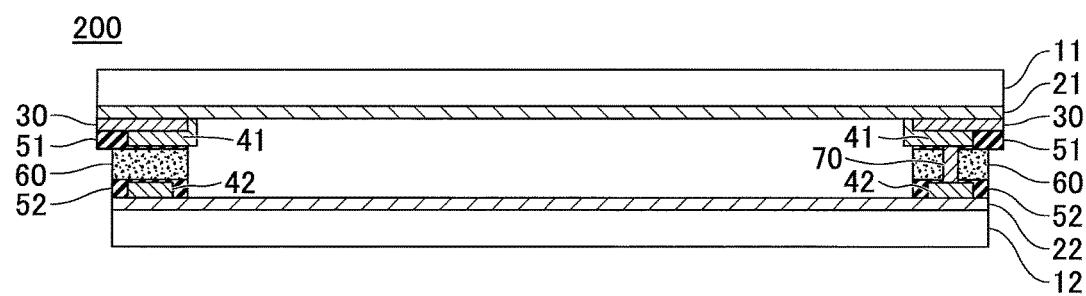
FIG. 8 is a cross-sectional view of an example of a touch panel according to a second embodiment.

FIG. 8 is a cross-sectional view of the touch panel 200 according to the second embodiment.

As illustrated in FIG. 8, the first wire has part thereof laminated to the decorative layer 30 in an overlapping manner, and has an end part thereof extending inside the decorative layer 30 to be in physical contact with the first conductive film 21. The part of the first wire 41 in physical contact with the first conductive film 21 is made as small as possible to ensure that the most of the first wire 41 is hidden behind the decorative layer 30 as viewed from the direction of the first substrate 11. Accordingly, the unhidden part of the first wire 41 does not degrade the aesthetic appearance of the metal plate 200 to an undesirable degree.

The above-noted configuration allows the first wire 41 to be directly connected to the first conductive film 21 to generate a potential gradient in the first conductive film 21 without relying on the intervening decorative layer 30. Such a direct electrical contact between the first conductive film 21 and the first wire 41 allows the decorative layer 30 to be made of insulating material, which serves to widen the range of materials usable for the decorative layer 30, thereby reducing the manufacturing cost.

Third Embodiment

In the following, a third embodiment will be described with reference to the accompanying drawings. A description will be omitted of the same elements as those of the embodiments already described.

In a touch panel 300 according to the third embodiment, the decorative layer 30 has part thereof made of conductive material at the position at which the first wire 41 is formed, and has part thereof made of insulating material at the position at which the first wire 41 is not formed.

Figure 9:
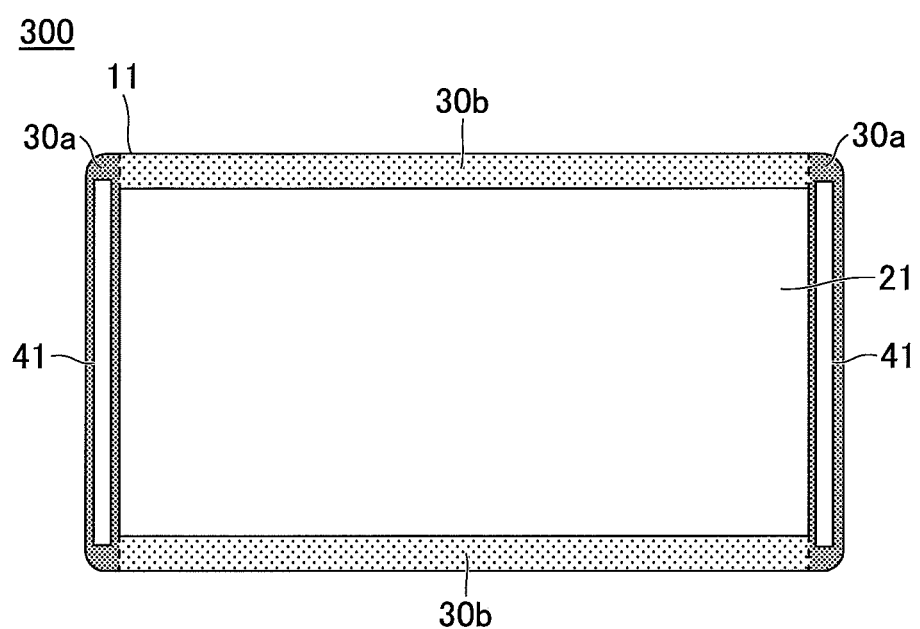
FIG. 9 is a bottom view of an example of a first substrate according to a third embodiment.

FIG. 9 is a bottom view of an example of the first substrate 11 according to the third embodiment. In this embodiment, decorative layer parts 30a at the position at which the first wire 41 is formed are made of conductive material, and decorative layer parts 30b at the position at which the first wire 41 is not formed are made of insulating material.

In the case of decorative layer parts being made of conductive material and situated at the position at which the first wire 41 is not formed, the potential gradient generated in these decorative layer parts may affect a potential gradient in the first conductive film 21, thereby deforming equipotential contours in the first conductive film 21. In consideration of this, the decorative layer parts 30b formed in the area where the first wire 41 is not present are made of insulating material to reduce an electrical influence of the decorative layer parts 30b on a potential gradient in the first conductive film 21. This arrangement enables the realization of parallel equipotential contours in the first conductive film 21. The realization of parallel equipotential contours in the first conductive film 21 then enables an accurate position detection by the touch panel 300.

According to the touch panel of the embodiments heretofore described, the decorative layer disposed between the first substrate and the second substrate serves to hide the first wires and the like, and also serves to impart evenness to the surface of the first substrate. This arrangement also enables an accurate position detection as previously described.

Although touch panels have heretofore been described according to the embodiments, the present invention is not limited to those embodiments. Various changes and modifications may be made without departing from the scope of the invention.

The present application is based on Japanese priority application No. 2014-263132 filed on Dec. 25, 2014, with the Japanese Patent Office, the entire contents of which are hereby incorporated by reference.

What is claimed is:

1. A touch panel, comprising:
a first substrate having a first conductive film formed on a surface thereof;
a second substrate disposed to face the first substrate on a same side thereof as the first conductive film, the second substrate having a second conductive film formed on a surface thereof facing toward the first substrate;
a decorative layer formed on the first conductive film on a surface thereof facing toward the second substrate, the decorative layer being formed along a perimeter of the first substrate;
a first wire formed on the decorative layer on a surface thereof facing toward the second substrate;
a first insulating layer laminated to the first wire;
a second wire formed on the second conductive film on a surface thereof facing toward the first substrate; and
a second insulating layer laminated to the second wire.

2. The touch panel as claimed in claim 1, wherein the decorative layer is made of conductive material.

3. The touch panel as claimed in claim 2, wherein the first conductive film has slits formed therein in an area where the decorative layer is not formed, the slits extending parallel to a direction in which a potential gradient is generated in the first conductive film.

4. The touch panel as claimed in claim 1, wherein the decorative layer has a portion thereof made of conductive material in an area where the first wire is formed, and has a portion thereof made of insulating material in an area where the first wire is not formed.

5. The touch panel as claimed in claim 1, wherein the decorative layer is made of insulating material, and the first wire is in physical contact with the first conductive film at a position at which the decorative layer is not formed.

6. The touch panel as claimed in claim 1, further comprising a connecting part disposed in a penetrating hole formed through the first insulating layer and the second insulating layer between the first wire and the second wire, the connecting part being made of conductive adhesive material to connect between the first wire and the second wire.

7. The touch panel as claimed in claim 1, further comprising an adhesive layer disposed in an area where neither the first wire nor the second wire is formed, the adhesive layer bonding the first insulating layer with the second insulating layer.

8. The touch panel as claimed in claim 1, further comprising a height adjusting part disposed on the decorative layer on the surface thereof facing toward the second substrate in an area where the first wire is not formed, the height adjusting part having a same thickness as the first wire.

* * * * *